United States Patent [19]

Jean-Claude et al.

[11] 3,773,148
[45] Nov. 20, 1973

[54] HYDRAULIC BRAKE ACTUATOR FOR A DISC BRAKE

[75] Inventors: Girauldon Jean-Claude, Ponthierry; Leone Massimo, Clichy, both of France

[73] Assignee: Societe Anonyme D.B.A., Paris, France

[22] Filed: Mar. 3, 1972

[21] Appl. No.: 231,645

[30] Foreign Application Priority Data
Mar. 19, 1971 France .............................. 7109738

[52] U.S. Cl. ............................. 188/72.4, 188/106 P
[51] Int. Cl. ........................................... F16d 65/22
[58] Field of Search ..................... 188/72.4, 106 P, 188/196 A, 196 BA, 345

[56] References Cited
UNITED STATES PATENTS

| | | | |
|---|---|---|---|
| 2,937,622 | 5/1960 | Brimhall | 188/106 P UX |
| 3,476,220 | 11/1969 | Kobayashi | 188/345 X |
| 3,502,181 | 3/1970 | Lepelletier | 188/345 |
| 3,576,236 | 4/1971 | Laverdant | 188/345 |

*Primary Examiner*—Duane A. Reger
*Attorney*—Ken C. Decker et al.

[57] ABSTRACT

A brake actuator is disclosed which includes a housing defining a bore therewithin which slidably receives a primary piston. The primary piston defines another bore therewithin which slidably receives a secondary piston. The primary piston cooperates with the end of the bore to define a primary pressure chamber and with the secondary piston to define a secondary pressure chamber. Since the area of the secondary piston is significantly smaller than the area of the primary piston exposed to the fluid pressure level in the primary chamber, the secondary piston remains in engagement with the main piston unless there is a substantial pressure differential between the chambers.

1 Claim, 1 Drawing Figure

3,773,148
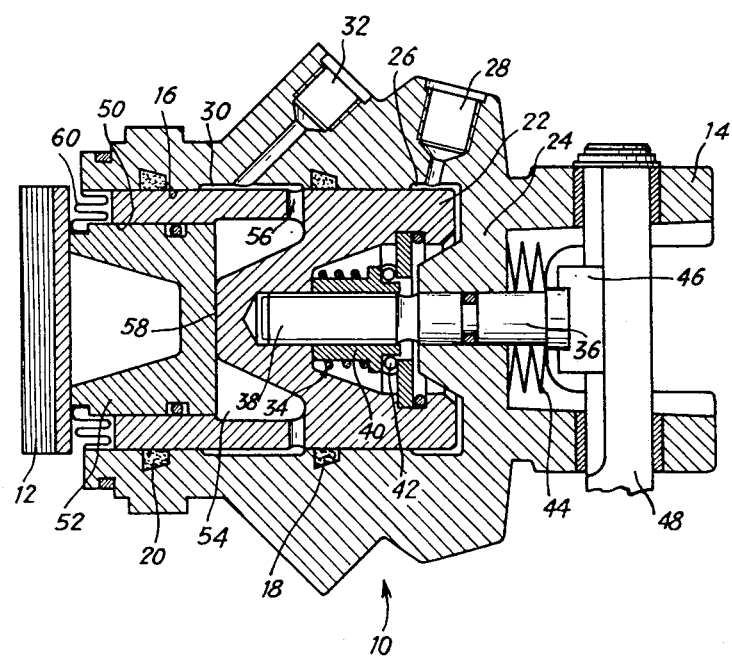

HYDRAULIC BRAKE ACTUATOR FOR A DISC BRAKE

The invention relates to a hydraulic brake actuator for a disc brake.

It has been already proposed to provide fluid pressure brake actuators of the type comprising a main slidable piston adapted to actuate the friction pad in a brake applying direction, sealingly arranged in a bore of a housing, defining a main fluid chamber, which chamber is adapted to be supplied through a main inlet port, with a first hydraulic control pressure, and an automatic wear adjuster device including two elements cooperating together and defining between the housing and the main piston a non retractable abuting connection in order to limit to a predeterminated amount the retraction of said main piston towards the inner of said fluid chamber when releasing the hydraulic control pressure in the latter.

For safety reasons, it has become necessary to provide a secondary control means for actuating friction pads so that in the event of a failure in the system portion controlling said first control pressure the brake can be operated normally.

For this purpose, there is provided according to the invention a hydraulic brake actuator, characterized in that the main piston is connected to the friction pad through the intermediary of a secondary movable piston slidably mounted in a bore provided in the main piston and defining therein a secondary fluid chamber adapted to be supplied through a secondary inlet port with a secondary hydraulic control pressure, the effective area of the face of said secondary piston subjected to said secondary hydraulic control pressure being lower than the effective area of the face of said main piston subjected to said first control pressure, so that only a significant pressure differential between the primary and secondary chambers causes a relative movement between main and secondary pistons.

The invention will now be described by way of example with reference to the sole accompanying drawings, showing a sectional view of an actuator according to the invention.

In the FIGURE, there is shown a hydraulic brake actuator 10 for use in a brake mechanism, such as a disc brake (not shown), in order to actuate a friction element such as a friction pad 12 in a brake applying direction.

The actuator 10 comprises a main piston 22 slidably mounted in a bore 16 provided in the housing 14, the sealing between the bore and the piston being obtained by means of annular seals 18 and 20. Piston 22 defines with the bottom 24 of bore 16 and the gasket 18 a main fluid chamber 26. Fluid is communicated into chamber 26. Through a main inlet port 28 provided in housing 14, with a first fluid control pressure, generated by a first pressure source of fluid (not shown). An annular groove 30 is provided in the bore 16 between the seals 18 and 20, and connected through a secondary inlet port 32 to a second separate source of fluid pressure (not shown).

An automatic adjuster device 34 of any known type, for compensating for the wear of the friction pads is arranged in chamber 26 between main piston 22 and a relatively fixed thrust stem 36 extending out of the bottom 24 of housing 14, in order to limit to a relatively low predeterminated amount the maximum retraction of main piston 22 when the first fluid control pressure is released. In the embodiment shown in the FIGURE, the wear adjuster device comprises essentially two elements 38 and 40 interconnected by a threaded connection, and connected to stem 36 and piston 22 respectively such as to define a non retractable abuting connection the length of which is adjustable. Element 40 is integral with stem 36 while element 38 is arranged between piston 22 and an annular thrust ball bearing 42 solid with said piston 22. The functioning of device 34 is well known and will not be described any more. Belleville washers 44 engage stem 36, urging same against a push element 46 excentrically arranged on a control shaft 48, rotatably mounted by any known means in housing 14 and adapted to be actuated in rotation by a mechanical control system (not shown).

According to the invention, the end of the piston 22 adjacent friction pad 12 is provided, with a bore 50 in which a secondary movable piston 52 is slidably and sealingly mounted, normally in abutment against friction pad 12. Piston 52 cooperates with the bore 50 to define a secondary fluid chamber 54 which is supplied with fluid pressure through radial passages 56 provided in piston 22 which communicates with the annular groove 30 and therefore with the second fluid control pressure. The effective area of the face of piston 52 subjected to the second fluid control pressure is less than the effective area of the face of piston 22 subjected to said first fluid control pressure so that as long as the first and second control pressures are substantially equal, piston 52 remains in abutment against piston 22. A protective boot 60 is suitably disposed between piston 52 and housing 14.

I claim:

1. In a hydraulic brake actuator:
   a housing defining a primary bore therewithin;
   a primary piston slidably and sealingly mounted in said primary bore and cooperating with one end of the primary bore to define a primary fluid pressure chamber therebetween, said primary piston defining a secondary bore therewithin;
   a secondary piston slidably and sealingly mounted in the secondary bore and cooperating with the end of said secondary bore to define a secondary fluid pressure chamber therebetween, the diameter of said secondary bore being substantially less than the diameter of said primary bore whereby the effective areas of said secondary piston and of said primary piston exposed to the fluid pressure level in said secondary bore are substantially less than the area of said primary piston exposed to the fluid pressure level in said primary chamber;
   a pair of seals disposed between the wall of said primary bore and the outer circumferential surface of said primary piston, an annular fluid compartment defined between said seals, and means communicating said comparment with said secondary chamber;
   means communicating said primary chamber with a first fluid pressure source and communicating said compartment with a second fluid pressure source normally equal to the first fluid pressure source; and
   means disposed in said primary chamber responsive to movement of said primary piston away from said one end of said primary bore in excess of a predetermined distance to limit retraction of said primary piston to said predetermined distance.

* * * * *